UNITED STATES PATENT OFFICE.

ROBERT WAHL, OF CHICAGO, ILLINOIS, ASSIGNOR TO WAHL-HENIUS RESEARCH LABORATORY, OF CHICAGO, ILLINOIS, A CORPORATION OF ILLINOIS.

FOOD PRODUCT AND METHOD OF PREPARING THE SAME.

1,178,039.  Specification of Letters Patent.  Patented Apr. 4, 1916.

No Drawing.   Application filed September 9, 1915.   Serial No. 49,681.

*To all whom it may concern:*

Be it known that I, ROBERT WAHL, a citizen of the United States, residing at Chicago, in the county of Cook and State of Illinois, have invented a new and useful Food Product and Method of Preparing the Same, of which the following is a specification.

My invention relates to a method or process of rendering suitable for human food and for use in human food products ungerminated vegetable substances containing trans-location diastase and insoluble carbohydrates, phosphates and proteids.

More particularly I am at present concerned with the utilization of substances containing or consisting largely of the aleurone layer of vegetable seeds. The most common source of supply of such material is bran and other cereal matters of a similar nature, such as the offal of pearl barley, the cortex of maize, the croppings of beans resulting from the manufacture of oat meal and the aleurone layer of the pea or other leguminous plants. On account of the high nutrient value of the ingredients mentioned and on account of their particular fitness in other respects they form a basis for the preparation of a high grade food product for human consumption, and also for other purposes, such as the development of bakers' yeast, which utilizes for its propagation or growth the same material for the building up of the protoplasm as does the human digestive system, and as a basis for vinegar manufacture, distilled spirits, sugars and syrups.

I have found that when bran or any like material, such, for instance, as the offal of pearl barley or the cortex of maize as produced in hominy mills and in corn products manufacture, is mixed with water and maintained at a temperature at which certain bacteria, in the present instance, particularly lactic acid bacteria, can develop, and preferably at temperatures highly favorable for their development, such as 45° to 55° C., the lactic acid bacteria naturally contained in the bran or the like will propagate and by their activity form lactic acid, which in turn acts upon the tribasic phosphates which are contained in abundant quantities in such materials, converting the same first into neutral phosphates and these in turn into acid phosphates, while at the same time, the lactic acid exerts a proteolytic effect either directly on the proteids of the bran or the like material, or indirectly by liberating proteolytic enzyms contained in the material, which enzyms then exert a digestive effect upon the said proteids. (See my Letters Patent Nos. 649,241, 647,648.) In this manner the insoluble tribasic phosphates and the insoluble proteids are rendered soluble and assimilable and serve as a fit media for the growth of lactic acid bacteria and also for any other organisms, such as yeast, which may be propagated in the said mash after cooling the same to a proper temperature, when the action of the lactic acid has been sufficiently advanced. A mash prepared in this manner can be used as a basis for the production of beverages, such as beer or distilled liquors, for instance, or for non-alcoholic beverages, by adding to the mash at suitable temperatures gelatinized starch. This added starch is readily inverted by the diastase or amylase contained in the bran. Such amylase is widely distributed in nature, being contained in all cereals and other seeds, also in other parts of most plants, for instance in the leaves of the hop plant. This amylase is commonly known as translocation diastase and is assumed by most investigators on this subject to have somewhat different properties from the diastase developed during the germination of seed; for instance, the optimum temperature of inversion of gelatinized starch is given as between 45° and 50° C. for this amylase, whereas for germination diastase (that is malt diastase) it is commonly considered to be between 50° and 60° C. While this translocation diastase has been the object of considerable study, I am not aware that it has hitherto been put to any technical use, the quantity contained in various parts of plants having been considered too small. I find, however, that the quantity and activity of the amylase contained in bran is sufficient to invert a considerable amount of gelatinized starch between 45° and 60° C. or thereabout, and that by the aid of this starch, added to the bran mash, I can obtain a wort comparable in all respects, as to its suitability for making beer or non-alcoholic beverages to brewers' wort made from malt with or without the employment of unmalted cereals, the proportion of starch to bran determining the composition of the resultant wort as to carbohydrates, dextrin, maltose, proteids (peptones and phosphates), and phosphate of potash. I find furthermore, that due to the difference in action between the amylase and germination diastase it is possible to control the mashing process to obtain a wort lower in sugar than the ordinary brewers' wort.

Bran as prepared by milling processes ordinarily contains starch mechanically adhering to the bran particles, and this starch being in a raw or crude state (that is, not gelatinized), is not sufficiently attacked by the amylase of the bran during the mashing process. This mechanically adhering raw starch may be readily removed from the bran, however, by washing. In carrying out my process for the utilization of bran, I, therefore, prefer to begin by subjecting the bran to a washing operation, water being used as a washing fluid, and then drain off the wash water, which will carry with it in suspension the starch and in solution the diastase and other readily soluble constituents of the bran. This liquor is allowed to stand until the starch is settled, which will be found to be the case after some hours, say over night. The water may then be drained off, leaving the starch as a sediment, and such starch-freed water may then be mixed with the washed bran to form a mash. The mash is maintained at a temperature of about 45° to 55° C. for about an hour, when a sufficient quantity of lactic acid will be found to have formed and the desired effect on the phosphates and the albumen obtained. The gelatinized starch in the form of boiled starch or as boiled corn, grits, or rice, may then be added to the mash and the mashing operation continued until the desired invention has occurred, the process being stopped before free acid appears in the mash. I have found it convenient to use dry starch, gelatinized according to a process which results in the readily inverted product known on the market as "mazam". Instead of employing starch in my mash, however, I may use, for the purpose of obtaining the necessary carbohydrates, dextrin or other sugar in the form of corn syrup, glucose or any suitable sugar found on the market. I also prefer to make use of the starch which settles out of the bran wash-water, having first gelatinized the same by boiling, thus utilizing to the best advantage all of the constituents of the bran.

While the process as described above may be readily carried out, the development of the lactic acid occurring from the propagation of the bacteria naturally contained in the bran, I prefer to inoculate the mash with lactic acid bacteria or some other acid forming microbe in order to obtain as nearly as possible a development of that kind or species of microbe which I consider most desirable for my particular purpose. The process may be shortened and equally good or better results obtained by adding the lactic acid, as such, to the mash instead of depending upon the propagation of the bacteria and the formation of the lactic acid during the mashing process. For this purpose the sour liquid of my Patent, No. 1,028,508, June 4, 1912, is particularly useful and desirable, this liquid containing in addition to a considerable percentage of lactic acid, acid forming bacteria of the desired character and activity. It therefore accomplishes the double purpose of inoculating the mash and furnishing lactic acid at the very beginning of the process.

In order to obtain the flavor which kiln-dried malt imparts to beer, I may add to my mash caramel malt or roast malt. Any beer-color, such as porterine, may also be introduced at any stage of the process. I obtain quite satisfactory results, however, by heating bran in a moistened condition to sufficiently high temperature to partially torrify it, temperatures between 150° and 200° C. being suitable for this purpose, and then employing a small proportion of this caramelized bran, either dried or in its moist condition, in the mashing process. The preferred manner of producing this torrified bran is to moisten it with from 50 per cent. to 200 per cent. of its weight of water, and then heat the moistened material very slowly through the lower ranges of temperature, that is up to about 60° C. I may also add lactic acid or my sour liquid. During such prolonged heating the bacteria and enzyms of the bran and of said sour liquid will act in precisely the same manner as during the ordinary mashing process, whereby the insoluble and indigestible constituents of the bran become changed to soluble and assimilable constituents. I may also add during this process or before, a suitable quantity of gelatinized starch, and such starch will be inverted in precisely the same manner as during the ordinary mashing process. After the mixture has reached a temperature substantially above 70° the conversion will cease, and the temperature may then be quickly raised to 150° or thereabout in order to effect the desired torrification or caramelization.

This process of producing a torrified or caramelized product from material of the character of bran is more fully described and claimed in my co-pending application, Serial No. 58518, filed October 29, 1915.

I find that the amylase developed during the mashing process is capable, under the conditions given, of inverting a very considerable quantity of starch, amounting to two or three times the quantity of bran employed. I may, therefore, readily obtain worts, mashes, or sugar-containing extracts as high in extract as when mashing with malt.

It will be understood from the foregoing that by my invention I have provided a method of utilizing as a basis of food supply bran and the like materials containing large quantities of phosphates and nitrogenous substances but hitherto considered unsuited for food products of this character. By my process, however, I produce a wort entirely suited to serve as a basis for preparing alcoholic beverages such as beer, or distilled liquors, and also for non-alcoholic beverages and extracts; as a nutrient medium for the propagation of yeast and lactic acid bacteria and other microbes, and as a basis of vinegar production. It will further be understood that my caramelizing bran in a moist condition I may impart to the wort a characteristic malt flavor. It is, therefore, possible to produce a wort or like product having the same nutrient value and the same flavor as worts produced from malt, by the use of bran and starch only.

It should also be noted that it is possible by the use of my invention, and in accordance with the teachings thereof, to attain alone either one of the two desirable results reached in the preferred process I have disclosed; i. e., it is possible to obtain an inversion of starch by the translocation diastase unaccompanied by any production or digestive effect of lactic acid, or, it is possible to digest, that is, render soluble, the insoluble constituents of the mash without any diastatic effect or inversion of starch. Thus, while the optimum inversion temperature is in the neighborhood of 45° to 50° C., there may be some diastatic activity at much higher temperatures, i. e., above 60°, while the acid forming bacteria would not propagate at this temperature. By mashing at such elevated temperatures therefore it is possible to produce a syrup substantially free of the acid-extracted substances. On the other hand, it is possible by heating to a sufficiently high temperature, for instance, 90° C, to effectively kill all diastatic enzyms in the mash. If such procedure be adopted, and lactic acid or lactic acid bacteria or both be added, the digestive effect of the acid may be had, producing a soluble and assimilable product free of sigar. By mashing the bran alone, without the addition of gelatinized starch, a digestible product having an exceedingly low sugar content may of course be obtained.

While it seems strange that so simple a process for rendering soluble, assimilable and digestible the nutritious constituents of bran and the like, should have escaped observation so long, I believe that this can be readily explained as having resulted from ignorance of the fact that the lactic acid as it is formed (when bran, for instance, is mixed with warm or hot water) becomes at first neutralized by the phosphates of the grain, changing the basic phosphates to neutral phosphates, which takes place without any apparent outward indication. After a time the neutral phosphates are changed to acid phosphates, the presence of which also escapes detection by the casual observer, since these acid phosphates do not react upon litmus, the most common and sensitive indicator for acidity although phenolphthalein will reveal their presence. It is only after all, or the larger amount of the basic phosphates are turned into neutral phosphates and these in turn into acid phosphates, and the continued development of lactic acid results in the formation of free lactic acid in the mash that litmus will be acted upon, but now the acidification has proceeded so far that the product would be considered unfit for use as a basis for food products. The development of acid if permitted to continue leads to an acidity of one-half to three per cent., the resultant product being the sour liquor described in my Letters Patent No. 1,028,508. Whether the foregoing be a true explanation or not, it is nevertheless a fact that bran and the like cereal products have hitherto been considered unsuitable for use as the basis of a high grade wort or food product, whereas, in fact, I find that by my process a wort or food product, of the most nutritious, palatable and digestible character may readily be produced from bran and the like cereal products hitherto regarded as wholly unsuitable for this purpose.

While in the foregoing specification I have particularly described what I consider to be the best method of carrying out my process, and have endeavored to analyze and ascertain the true character of the various reactions which take place and the reasons therefor, I do not regard my invention as limited to the specific *modus operandi* mentioned, nor do I regard my invention as founded wholly upon the conclusions as to the nature of the changes taking place. On the other hand, the specific details of operation and my explanation of the reasons therefor are to be regarded as illustrative only and for the purpose of making my invention more clear, and are not to be construed as limitations thereof, except in so far as I have included such limitations within the terms of the following claims, in which it is my intention to claim all novelty inherent in my process as broadly as is possible in view of the prior art.

What I claim is:

1. The process of preparing food products which consists in mixing an ungerminated vegetable product containing trans-location diastase, and insoluble phosphates, proteids and carbohydrates, with water, maintaining the mixture at a temperature above 40° C., and adding starch to the mixture during the said process, whereby the said insoluble constituents are rendered soluble and the starch is inverted by the enzymatic effect of the said diastase.

2. The process of preparing food products which consists in mixing an ungerminated vegetable product containing trans-location diastase, and insoluble phosphates, proteids and carbohydrates, with water, maintaining the mixture at a temperature favoring the development of lactic acid bacteria therein, and adding gelatinized starch to the mixture during the said process, whereby the said insoluble constituents are rendered soluble and the starch is inverted by the enzymatic effect of the said diastase.

3. The process of preparing food products which consists in mixing with water an ungerminated vegetable substance containing the aleurone layer of seeds, maintaining the mixture at a temperature above 40° C., and adding starch to the mixture during the process, whereby the insoluble nutrient substances of the said aleurone layer are rendered soluble and the added starch is inverted by the enzymatic effect of the said diastase.

4. The process of preparing food products which consists in mixing with water an ungerminated vegetable substance containing the aleurone layer of seeds, maintaining the mixture at a temperature favoring the development of lactic acid bacteria, and adding gelatinized starch to the mixture during the process, whereby the insoluble nutrient substances of the said aleurone layer are rendered soluble and the added starch is inverted by the enzymatic effect of the diastase of the said aleurone layer.

5. The process of preparing food products from cereal matter of the character of bran, which consists in first washing the said material to remove mechanically adhearing starch, drawing off the wash water, separating the suspended starch therefrom, returning the wash water to the washed material, and maintaining the mixture at a temperature favoring the development of acid-forming bacteria therein, for the purpose specified.

6. The process of preparing food products from cereal matter of the character of bran, which consists in first washing the material to remove mechanically adhering starch, drawing off the wash water, separating the suspended starch therefrom, returning the wash water to the washed material, maintaining the mixture at a temperature favoring the development of acid-forming bacteria, heating the starch separated from the wash water to render the same soluble, adding such soluble starch to the mixture, and continuing the mashing process until the added starch has been inverted to the desired degree.

7. The process of preparing food products from cereal matter of the character of bran, which consists in first washing the material to remove mechanically adhering starch, drawing off the wash water, separating the suspended starch therefrom, returning the wash water to the washed material, maintaining the mixture at a temperature favoring the development of acid-forming bacteria, adding gelatinized starchy material, and continuing the mashing process until the added starch has been inverted to the desired degree.

8. The process of preparing food products from cereal matter of the character of bran, which consists in mixing said cereal matter with water, adding gelatinized starch to the mixture, and maintaining the mixture at a temperature favoring the development of bacteria and the activity of the diastatic enzyms contained therein, for the purpose specified.

9. The process of preparing food products which consists in inoculating an aqueous mass containing an ungerminated vegetable substance having as constituents insoluble phosphates, proteids and carbohydrates, with active lactic acid bacteria, and maintaining the mash at a temperature favoring the propagation of the said bacteria until the said insoluble constituents have been been rendered soluble, the process being arrested before free lactic acid appears in the mash.

10. The process of preparing food products which consists in mixing with water an ungerminated vegetable substance containing trans-location diastase and starch, and maintaining the mixture at a temperature above 40° C., whereby the said starch is inverted.

11. The process of preparing food products which consists in mixing with water an ungerminated vegetable substance containing the aleurone layer of seeds, adding gelatinized starch to the mixture, and maintaining the mixture at a temperature favoring the activity of trans-location diastase, whereby the said starch becomes inverted to sugar.

12. The process of preparing food products which consists in mixing with water an ungerminated vegetable substance containing the aleurone layer of seeds, adding gelatinized starch to the mixture, and maintaining the mixture at a temperature between 45° and 70° C., whereby the added starch is inverted to sugar by the action of the trans-location diastase contained in the said aleurone layer.

13. The process of preparing food products which consists in mixing bran with water, adding gelatinized starch to the mixture, and maintaining the mixture at a temperature between 45° and 70° C., for a sufficient length of time for the diastase contained in the said bran to invert the said gelatinized starch.

14. An ungerminated vegetable product containing the lactic-acid extracted substances of the aleurone layer of seeds, the said product being substantially devoid of free acid.

15. An ungerminated vegetable product containing sugar and the lactic acid-extracted substances of the aleurone layer of seeds, the said product being substantially devoid of free acid.

16. A syrup produced by mashing the ungerminated aleurone layer of seeds and gelatinized starch.

17. The product produced by mashing an ungerminated vegetable substance containing the aleurone layer of seeds and gelatinized starch.

ROBERT WAHL.

In presence of—
L. Heislar,
O. C. Avisus.